(12) United States Patent
Tomonaga et al.

(10) Patent No.: US 7,873,759 B2
(45) Date of Patent: Jan. 18, 2011

(54) INFORMATION PROCESSING SYSTEM AND METHOD OF ALLOCATING I/O TO PATHS IN SAME

(75) Inventors: Shigenori Tomonaga, Yokohama (JP); Hiroshi Yokouchi, Yokohama (JP); Nobuo Kobayashi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 205 days.

(21) Appl. No.: 12/342,314

(22) Filed: Dec. 23, 2008

(65) Prior Publication Data

US 2010/0115154 A1    May 6, 2010

(30) Foreign Application Priority Data

Oct. 30, 2008    (JP)    .............................. 2008-280302

(51) Int. Cl.
*G06F 3/00*    (2006.01)
*G06F 13/38*    (2006.01)

(52) U.S. Cl. .............................. 710/38; 710/40; 710/58
(58) Field of Classification Search ........................ None
See application file for complete search history.

(56) References Cited

U.S. PATENT DOCUMENTS

| | | | | |
|---|---|---|---|---|
| 5,253,248 A * | 10/1993 | Dravida et al. ............... | 370/228 |
| 5,812,549 A * | 9/1998 | Sethu .......................... | 370/389 |
| 5,920,852 A * | 7/1999 | Graupe ........................ | 706/26 |
| 5,991,835 A * | 11/1999 | Mashimo et al. ............. | 710/58 |
| 6,182,120 B1 * | 1/2001 | Beaulieu et al. ............. | 709/207 |
| 6,249,800 B1 * | 6/2001 | Aman et al. ................. | 718/105 |
| 6,434,631 B1 * | 8/2002 | Bruno et al. .................... | 710/6 |
| 6,542,944 B2 * | 4/2003 | D'Errico ....................... | 710/38 |
| 6,587,844 B1 * | 7/2003 | Mohri .......................... | 706/20 |
| 6,788,686 B1 * | 9/2004 | Khotimsky et al. ......... | 370/394 |
| 6,871,011 B1 | 3/2005 | Rahman et al. | |
| 6,973,529 B2 * | 12/2005 | Casper et al. ............... | 710/316 |
| 7,016,971 B1 * | 3/2006 | Recio et al. .................. | 709/233 |
| 7,017,138 B2 * | 3/2006 | Zirojevic et al. .............. | 716/16 |
| 7,107,593 B2 * | 9/2006 | Jones et al. .................. | 718/103 |
| 7,123,620 B1 * | 10/2006 | Ma ........................ | 370/395.32 |
| 7,277,984 B2 * | 10/2007 | Ghosal et al. ................ | 711/112 |
| 7,292,594 B2 * | 11/2007 | Meempat et al. ............ | 370/413 |
| 7,313,629 B1 * | 12/2007 | Nucci et al. .................. | 709/241 |

(Continued)

FOREIGN PATENT DOCUMENTS

JP    6-035831    2/1994

(Continued)

Primary Examiner—Cheng-Yuan Tseng
(74) Attorney, Agent, or Firm—Brundidge & Stanger, P.C.

(57) ABSTRACT

Provided is an information processing system that communicates with a storage apparatus through a plurality of paths $P_i$ (i=1 to n, where n is a total number of the paths), and that issues an I/O to the storage apparatus through one of the paths $P_i$. The information processing system sets weights $W_i$ for the respective paths $P_i$; obtains an I/O issue interval $d_i$ of each of the paths $P_i$ by dividing a sum total $\Sigma W_i$ of the weights $W_i$ by the weight $W_i$ set for the path $P_i$; obtains I/O issue timings $t_i(m)$ of each of the paths $P_i$ by using the following equation: $t_i(m)=d_i/C+m \cdot d_i$ (m=0, 1, 2, ...) (where C is a constant); and issues the I/Os to the paths $P_i$ in an order corresponding to the an order of the I/O issue timings $t_i(m)$ chronologically arranged.

9 Claims, 12 Drawing Sheets

U.S. PATENT DOCUMENTS

| | | | | |
|---|---|---|---|---|
| 7,492,717 | B2 * | 2/2009 | Mosko | 370/238 |
| 7,634,408 | B1 * | 12/2009 | Mohri | 704/251 |
| 7,675,863 | B2 * | 3/2010 | Werb et al. | 370/241 |
| 7,680,055 | B1 * | 3/2010 | Ramakrishnan et al. | 370/238 |
| 7,701,858 | B2 * | 4/2010 | Werb et al. | 370/241 |
| 7,707,345 | B2 * | 4/2010 | Diao et al. | 710/307 |
| 2002/0078267 | A1 * | 6/2002 | Rozario et al. | 710/22 |
| 2002/0174047 | A1 * | 11/2002 | Fernholz | 705/36 |
| 2003/0065871 | A1 * | 4/2003 | Casper et al. | 710/316 |
| 2005/0086363 | A1 * | 4/2005 | Ji | 709/235 |
| 2008/0151753 | A1 * | 6/2008 | Wynne | 370/235 |
| 2008/0301492 | A1 * | 12/2008 | Honda et al. | 714/6 |
| 2009/0043486 | A1 * | 2/2009 | Yang et al. | 701/117 |
| 2009/0113042 | A1 * | 4/2009 | Bivens et al. | 709/224 |

FOREIGN PATENT DOCUMENTS

| | | |
|---|---|---|
| JP | 10-289189 | 10/1998 |
| JP | 2002-197046 | 7/2002 |
| JP | 2004-185327 | 7/2004 |

* cited by examiner

PATH STATUS MANAGEMENT TABLE 23

SERVER SYSTEM 1

| PATH NAME | FLAG VALUE | | COUNTER VALUE | | PROCESSED DATA VOLUME (KB) |
|---|---|---|---|---|---|
| | DELAY | FAILURE | DELAY | FAILURE | |
| PATH 1 | 0 | 1 | 0 | 3 | 247157 |
| PATH 2 | 0 | 0 | 0 | 0 | 291066 |
| PATH 3 | 1 | 0 | 10 | 0 | 35700 |
| PATH 4 | 0 | 0 | 0 | 0 | 186502 |

SERVER SYSTEM 2

| PATH NAME | FLAG VALUE | | COUNTER VALUE | | PROCESSED DATA VOLUME (KB) |
|---|---|---|---|---|---|
| | DELAY | FAILURE | DELAY | FAILURE | |
| PATH 1 | 1 | 0 | 3 | 0 | 4521 |
| PATH 2 | 0 | 0 | 0 | 0 | 11938 |
| PATH 3 | 0 | 1 | 0 | 3 | 32654 |
| PATH 4 | 0 | 0 | 0 | 0 | 59874 |
| PATH 5 | 1 | 0 | 4 | 0 | 4985 |
| PATH 6 | 0 | 0 | 0 | 0 | 15984 |
| PATH 7 | 0 | 0 | 0 | 0 | 68574 |
| PATH 8 | 0 | 0 | 0 | 0 | 74865 |

FIG. 5

PATH STATUS INTEGRATED MANAGEMENT TABLE 44

| SERVER NAME | PATH NAME | PATH ID | CURRENT WEIGHT | FLAG VALUE DELAY | FLAG VALUE FAILURE | COUNTER VALUE DELAY | COUNTER VALUE FAILURE | PROCESSED DATA VOLUME (KB) | REVISED WEIGHT |
|---|---|---|---|---|---|---|---|---|---|
| SERVER SYSTEM 1 | PATH A | 1 | 10 | 0 | 1 | 0 | 3 | 247157 | 8 |
| SERVER SYSTEM 1 | PATH B | 2 | 12 | 0 | 0 | 0 | 0 | 291066 | 12 |
| SERVER SYSTEM 1 | PATH C | 3 | 3 | 1 | 0 | 10 | 0 | 35700 | 2 |
| SERVER SYSTEM 1 | PATH D | 4 | 8 | 0 | 0 | 0 | 0 | 186502 | 9 |
| SERVER SYSTEM 2 | PATH A | 1 | 3 | 1 | 0 | 3 | 0 | 4521 | 2 |
| SERVER SYSTEM 2 | PATH B | 2 | 4 | 0 | 0 | 0 | 0 | 11938 | 4 |
| SERVER SYSTEM 2 | PATH C | 3 | 8 | 0 | 1 | 0 | 3 | 32654 | 7 |
| SERVER SYSTEM 2 | PATH D | 4 | 11 | 0 | 0 | 0 | 0 | 59874 | 11 |
| SERVER SYSTEM 2 | PATH E | 5 | 4 | 1 | 0 | 4 | 0 | 4985 | 3 |
| SERVER SYSTEM 2 | PATH F | 6 | 5 | 0 | 0 | 0 | 0 | 15984 | 5 |
| SERVER SYSTEM 2 | PATH G | 7 | 10 | 0 | 0 | 0 | 0 | 68574 | 10 |
| SERVER SYSTEM 2 | PATH H | 8 | 9 | 0 | 0 | 0 | 0 | 74865 | 9 |

| HBA PERFORMANCE INFORMATION (KB/SECOND) CURRENT | HBA PERFORMANCE INFORMATION (KB/SECOND) AFTER REVISION | SWITCH PERFORMANCE INFORMATION (KB/SECOND) CURRENT | SWITCH PERFORMANCE INFORMATION (KB/SECOND) AFTER REVISION | CHA PERFORMANCE INFORMATION (KB/SECOND) CURRENT | CHA PERFORMANCE INFORMATION (KB/SECOND) AFTER REVISION |
|---|---|---|---|---|---|
| 23025 | 25851 | 25048 | 24980 | 23392 | 24021 |
| 26665 | 27862 | 28025 | 27995 | 26891 | 27852 |
| 27878 | 9262 | 27854 | 28321 | 28541 | 26548 |
| 18265 | 16084 | 17895 | 18564 | 18504 | 19008 |
| 1308 | 1415 | 1526 | 1708 | 1654 | 418 |
| 3855 | 3908 | 3555 | 3674 | 4012 | 3984 |
| 11705 | 12008 | 11133 | 11645 | 11554 | 10992 |
| 26541 | 27011 | 26045 | 27145 | 25412 | 24857 |
| 3564 | 3428 | 3245 | 965 | 4122 | 4220 |
| 9851 | 9666 | 9245 | 9654 | 10012 | 9980 |
| 30852 | 31152 | 29855 | 30012 | 29564 | 29800 |
| 32800 | 33002 | 34055 | 33920 | 34054 | 33985 |

FIG. 6

I/O ISSUE ORDER INTEGRATED MANAGEMENT TABLE 45

| | | I/O ISSUE ORDER | | | | | | | | | |
|---|---|---|---|---|---|---|---|---|---|---|---|
| SERVER SYSTEM 1 | ORDER | 1 | 2 | 3 | 4 | 5 | 6 | 7 | 8 | 9 | 10 |
| | PATH NAME | PATH B | PATH A | PATH D | PATH B | PATH A | PATH C | PATH D | PATH B | PATH A | PATH B |
| | PATH ID | 2 | 1 | 4 | 2 | 1 | 3 | 4 | 2 | 1 | 2 |
| SERVER SYSTEM 2 | ORDER | 1 | 2 | 3 | 4 | 5 | 6 | 7 | 8 | 9 | 10 |
| | PATH NAME | PATH D | PATH G | PATH C | PATH H | PATH F | PATH B | PATH E | PATH D | PATH G | PATH A |
| | PATH ID | 4 | 7 | 3 | 8 | 6 | 2 | 5 | 4 | 7 | 1 |

| | I/O ISSUE ORDER | | | | | | | | | |
|---|---|---|---|---|---|---|---|---|---|---|
| ORDER | 11 | 12 | 13 | 14 | ... | 32 | 33 | ... | 53 | 54 |
| PATH NAME | PATH D | PATH A | PATH B | PATH D | ... | PATH A | PATH B | ... | | |
| PATH ID | 4 | 1 | 2 | 4 | ... | 1 | 2 | ... | | |
| ORDER | 11 | 12 | 13 | 14 | ... | 32 | 33 | ... | 53 | 54 |
| PATH NAME | PATH H | PATH C | PATH D | PATH G | ... | PATH D | PATH B | ... | PATH D | PATH H |
| PATH ID | 8 | 3 | 4 | 7 | ... | 4 | 2 | ... | 4 | 8 |

FIG. 7

INFORMATION PROCESSING SYSTEM AND METHOD OF ALLOCATING I/O TO PATHS IN SAME

CROSS-REFERENCE TO RELATED APPLICATIONS

The present application claims a priority from Japanese Patent Application No. 2008-280302 filed on Oct. 30, 2008, the content of which herein incorporated by reference.

BACKGROUND OF THE INVENTION

1. Field of the Invention

The present invention relates to an information processing system and a method of allocating an I/O to paths in the information processing system. More particularly, the present invention relates to a technique which is used in an information processing system having an information processing apparatus and a storage apparatus coupled to each other through a plurality of paths, and which appropriately allocates an I/O to each path.

2. Related Art

As an objective of improving performance of a storage system having a configuration in which an information apparatus and a storage apparatus are coupled to each other, various research and development efforts have been made on how to issue I/Os (data input/outputs) exchanged between the information apparatus and the storage apparatus.

For example, Japanese Patent Application Laid-open Publication No. 2002-197046 discloses an algorithm for determining the schedule of I/O disk access based not on the priority of I/Os, but on the processing deadlines of the I/Os in order to allow a request with low priority in a queue to be preferentially provided even when there is a request with high priority.

In the meantime, where data input/outputs requests to a storage apparatus are distributed to each input/output paths by using a round-robin method, there is a problem that the data input/output requests of higher priority cannot be preferentially transmitted to the storage apparatus when there is a flood of data input/output requests to the storage apparatus. In order to solve this problem, Japanese Patent Application Laid-open Publication No. 2004-185327 discloses that a usage rate of each logical path is compared with a determination value and that, based on the comparison result, the data input/output request is switched to a control to be transmitted to the storage apparatus through a logical path associated with information for specifying a particular area in the storage apparatus.

Moreover, Japanese Patent Application Laid-open Publication No. 10-289189 discloses that, when an I/O sub-system is in a high load status due to an accumulation of I/O requests to a particular apparatus, a reduction in the throughput of the whole computer system is prevented by automatically restricting the issue of I/O requests to the particular apparatus while preferentially issuing I/O requests to another apparatus.

Meanwhile, Japanese Patent Application Laid-open Publication No. 6-35831 discloses a technique for reducing a waiting time of input/out processing for data with high priority. Specifically, when multiple data input/output instructions are issued at the same time, a backlog of data input/output processing is caused. To deal with the backlog, the order of processing is determined by first-preferentially selecting a data input/output instruction with high data input/output priority, and then by second-preferentially selecting a data input/output instruction targeting a location that is the nearest to a location where the last data input/output processing has been performed.

By the way, in an information processing system having an information apparatus and a storage apparatus coupled to each other through a plurality of paths may use, for example, the following algorithms in order to balance the loads among the paths: an algorithm that sets weights in respective plurality of paths to issue an I/O to each of the paths according to the weights thus set; and an algorithm that preferentially issues I/Os to a path that has a lower load. However, adopting such algorithms may increase the load on a particular one of the paths because multiple I/Os may be issued to the particular path during a short period of time and in a concentrated manner, and thereby may impair the effect of the load balancing.

SUMMARY OF THE INVENTION

The present invention has been made in view of the above problems, and an object thereof is to provide an information processing system having an information apparatus and a storage apparatus coupled to each other through a plurality of paths, the information processing system being capable of appropriately allocating I/Os to each of the paths, and also to provide a method of allocating I/Os to paths in the information processing system.

To attain the above object, an aspect of the present invention is an information processing system that communicates with a storage apparatus through a plurality of paths $P_i$ (i=1 to n, where n is a total of the paths), and issues an I/O to the storage apparatus through one of the paths $P_i$. The information processing system includes: a first processing unit that sets weights $W_i$ to the respective paths $P_i$; a second processing unit that obtains an I/O issue interval $d_i$ by dividing a sum total $\Sigma W_i$ of the weights $W_i$ by the weight $W_i$ set to the respective paths $P_i$; a third processing unit that obtains I/O issue timings $t_i(m)$ of each of the paths $P_i$ from the following equation: $t_i(m)=d_i/C+m \cdot d_i$ (m=0, 1, 2, ...) (where C is a constant); and a fourth processing unit that issues the I/Os to the paths $P_i$ in an order corresponding to an order of the I/O issue timings $t_i(m)$ chronologically arranged.

In addition, the first processing unit sets the weights $W_i$, according to, for example, loads on and performance of the respective paths $P_i$. Moreover, the paths $P_i$ are specified by a combination of a network port of the information processing system, a network port of the storage apparatus, and a network port of a switch which is interposed between the above two ports, for example.

According to the invention described above, I/Os are prevented from being issued to a particular one of the paths $P_i$ during a short period of time in a concentrated manner. Specifically, according to the present invention, I/Os are issued to each of the paths $P_i$ in accordance with the order obtained by chronologically arranging the I/O issue timings $t_i(m)$. Accordingly, I/Os can be prevented from being allocated to a particular one of the paths $P_i$ during a short period of time in a concentrated manner. As long as the I/O allocation is performed in the orderly sequence, each path $P_i$ is assured a number of I/O issues in accordance to the weight $W_i$ of each path $P_i$, during a time period equivalent to the least common multiple of the I/O issue intervals $d_i$ of the respective paths $P_i$ (hereafter referred to as cycle T). As a result, the effect of load balancing based on path weight is assured, as well.

Another aspect of the present invention is the information processing system in which: the first processing unit recalculates the weights $W_i$ when load change in the path $P_i$ has exceeded a threshold value; the second processing unit obtains again the I/O issue interval $d_i$, based on the weights $W_i$ thus recalculated; the third processing unit obtains again the I/O issue timings $t_i(m)$, based on the once again obtained I/O issue interval $d_i$; and the fourth processing unit issues the I/Os to the paths $P_i$ in an order corresponding to an order of the once again obtained I/O issue timings $t_i(m)$ chronologically arranged.

As mentioned above, when load change in a certain one of the paths $P_i$ exceeds a threshold value, the weights $W_i$ are recalculated, thereby changing the order in which I/Os are issued to the paths $P_i$. Consequently, I/Os can be appropriately allocated to each of the paths $P_i$, according to the current (latest) load statuses of the respective paths $P_i$.

Yet another aspect of the present invention is the information processing system in which, the fourth processing unit issues the I/Os in an order giving priority to the path $P_i$ having a lower load among the paths $P_i$ having coinciding I/O issue timings $t_i(m)$, when there are paths $P_i$ that have coinciding I/O issue timings $t_i(m)$, the coinciding I/O issue timings $t_i(m)$ being the I/O issue timings $t_i(m)$ of different ones of the paths $P_i$ that coincide with each other as a result of arranging the I/O issue timings $t_i(m)$ in chronological order.

In this way, when the I/O issue timings $t_i(m)$ of different ones of the paths $P_i$ coincide, an I/O can be issued more preferentially to the one having a lower load. Accordingly, an appropriate load balancing can be accomplished.

In addition, the fourth processing unit issues the I/Os in an order giving priority to the path $P_i$ having a higher performance among the paths $P_i$ having coinciding I/O issue timings $t_i(m)$, when there are paths $P_i$ that have coinciding I/O issue timings $t_i(m)$, the coinciding I/O issue timings $t_i(m)$ being the I/O issue timings $t_i(m)$ of different ones of the paths $P_i$ that coincide with each other as a result of arranging the I/O issue timings $t_i(m)$ in chronological order.

In this way, when the I/O issue timings $ti(m)$ of different ones of the paths $P_i$ coincide, an I/O can be issued preferentially to a path having higher performance. Accordingly, an appropriate load balancing can be attained.

Moreover, the fourth processing unit cyclically replaces the path $P_i$ given priority to issue the I/Os among the paths $P_i$ each time an I/O issue timing $t_i(m)$ coincides, when having cyclically coinciding I/O issue timings $t_i(m)$, the cyclically coinciding I/O issue timings $t_i(m)$ being the I/O issue timings $t_i(m)$ of different ones of the paths $P_i$ that coincide with each other as a result of arranging the I/O issue timings $t_i(m)$ in chronological order.

In this way, when the I/O issue timings $t_i(m)$ of different ones of the paths $P_i$ coincide cyclically, I/Os can be allocated evenly to the paths $P_i$ without bias.

Other problems and methods for solving such disclosed in the present application will become apparent by reading the description of the present specification with reference to the accompanying drawings.

According to the present invention, each of paths can be assigned an appropriate number of I/Os according to the weight (I/O data flow) of the path in a certain time period (cycle) This prevents concentration of I/Os in any particular one of the paths.

BRIEF DESCRIPTION OF THE DRAWINGS

FIG. 5 is a diagram showing an example of a path status management table 23;

FIG. 6 is a diagram showing an example of a path status integrated management table 44;

FIG. 7 is a diagram showing an example of an I/O issue order integrated management table 45;

DETAILED DESCRIPTION OF THE INVENTION

A detailed description will be given below of an embodiment of the present invention with reference to the accompanying drawings.

System Configuration

Figure 1A:
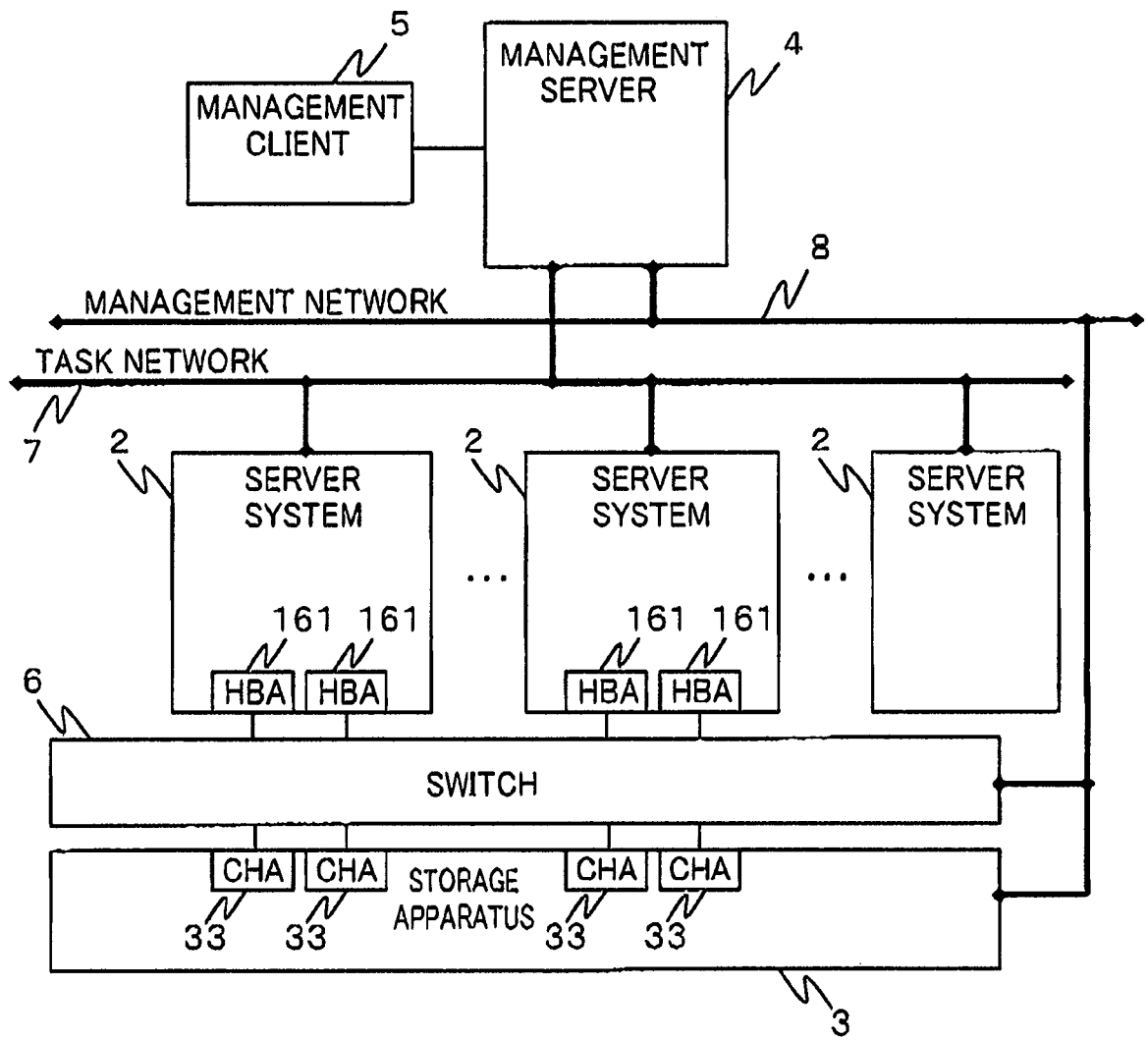
FIG. 1A is a diagram showing a configuration of an information processing system 1 described as an embodiment.

FIG. 1A shows a configuration of an information processing system 1 described as an embodiment. As shown in FIG. 1A, the information processing system 1 includes server systems 2, a storage apparatus 3, a management server 4, a management client 5, and a switch 6. Note that the numbers of the server system 2, the storage apparatus 3, the switch 6, the management server 4, and the management client 5 are not limited to those shown in FIG. 1A.

The server system 2 is coupled to the storage apparatus 3 through the switch 6 (network switch). The server system 2 is coupled to a task network 7 and is thereby coupled to the management server 4 and other external apparatuses, not shown, such as task terminals, that are coupled to the task network 7. An application and an operating system operate on the server system 2. Based on an I/O request received from the external apparatuses, the server system 2 issues (transmits) an I/O (for example, a data write request and a data read request) to the storage apparatus 3.

The management server 4 is coupled to the switch 6 and the storage apparatus 3 through a management network 8. The management client 5 is coupled to the management server 4.

A task application operates on the server system 2. The task application provides a task terminal (not shown) with various services. To provide the task terminal with the services, the task application issues an I/O to the storage apparatus 3 and gains access to data stored in the storage apparatus 3.

The management server 4 performs monitoring and control of each of the components (such as the server system 2, the storage apparatus 3, and the switch 6) of the information processing system 1. For example, the management server 4 acquires information on the server system 2 (such as performance information, operation status information, and coupling status information) through the task network 7. Moreover, the management server 4 acquires information on the switch 6 (such as load information and coupling status information) through the management network 8. In addition, the management server 4 acquires information on the storage apparatus 3 (such as load information and operation status information) through the management network 8. The management server 4 does not always have to be independent of (to be housed separately from) the server system 2. For example, the server system 2 may include the functions of the management server 4.

The management client 5 is an apparatus used by a user to gain access to the management server 4. The management client 5 includes user interfaces (such as a character user interface (CUI) and a graphical user interface (GUI)) through which monitoring and control of the information processing system 1 are performed by using the management server 4. The management client 5 does not always have to be independent of (to be housed separately from) the management server 4. For example, the management server 4 may include the functions of the management client 5.

The task network 7 and the management network 8 are each configured using, for example, a local area network (LAN), a wide area network (WAN), the Internet, a public communications network, or a dedicated line. The switch 6 is for example any of a Fibre Channel switch or a LAN switch (for example, a switching hub conforming to 10 BASE-T, 100 BASE-T, 1000 BASE-T (TX), or the like.) Note that the following description is provided based on the assumption that the switch 6 is a Fibre Channel switch, and that the server system 2 and the storage apparatus 3 are coupled to each other through a storage area network (SAN).

Figure 1B:
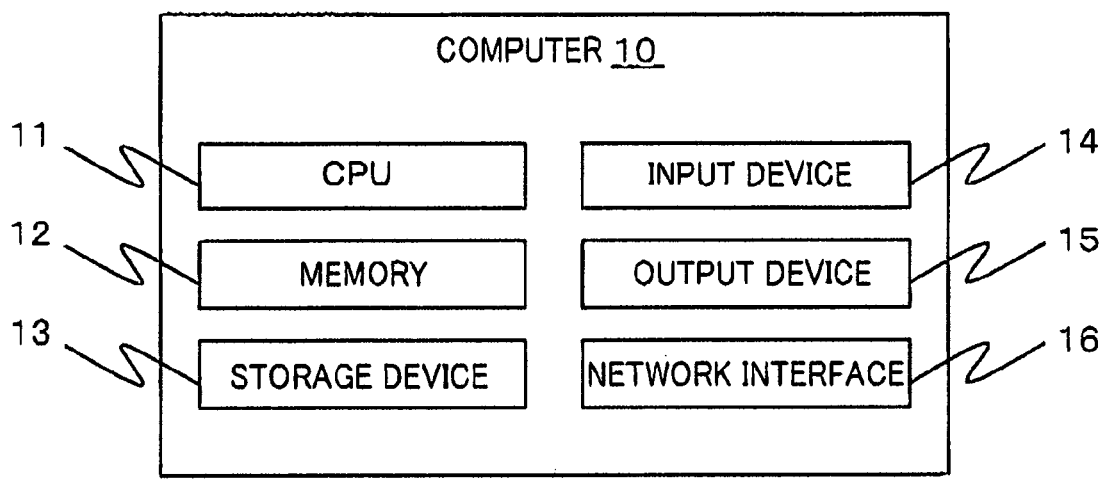
FIG. 1B is a diagram showing a hardware example of a computer that can be used as a server system 2, a management server 4, and a management client 5.

FIG. 1B shows a hardware example of a computer 10 (information processing apparatus) usable as the server system 2, the management server 4, and the management client 5. The computer 10 shown in FIG. 1B includes: a CPU 11; a memory 12 (such as a random access memory (RAM) and a read-only memory (ROM)); a storage device 13 (such as a hard disk and a semiconductor storage device (such as a solid state drive (SSD)); an input device 14 (such as a keyboard and a mouse) that accepts an operational input by the user; an output device 15 (such as a liquid crystal monitor and a printer); and a network interface 16 (such as a network interface card (NIC) and a host bus adapter (HBA)) that implements communications with other apparatuses. Note that, in the following description, it is assumed that the server system 2 includes an HBA 161 as the network interface 16 for communication with the storage apparatus 3.

Figure 1C:
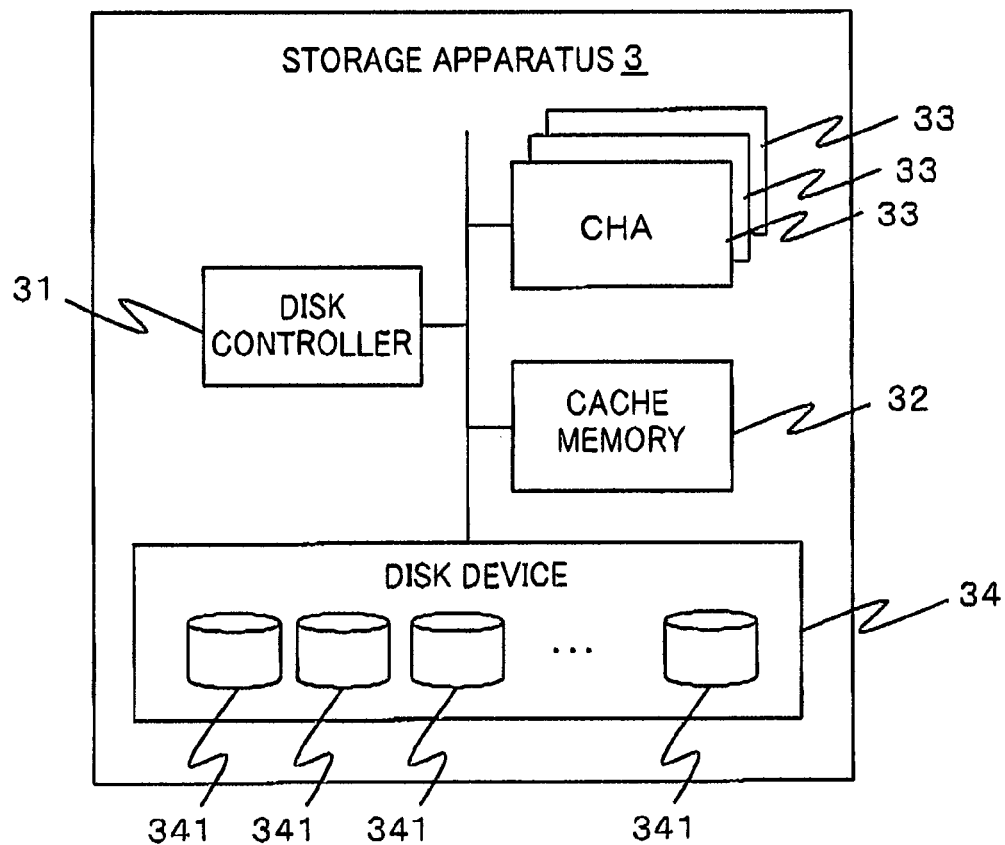
FIG. 1C is a diagram showing a hardware example of a storage apparatus 3.

FIG. 1C is a hardware example of the storage apparatus 3. The storage apparatus 3 shown in FIG. 1C is for example a disk array apparatus. The storage apparatus 3 includes a disk controller 31, a cache memory 32, channel adapters (CHAs) 33, and a disk device 34 (which may be either housed in the storage apparatus 3, or externally coupled to the storage apparatus 3).

Each CHA 33 includes an interface, such as NIC or HBA, to communicate with the server system 2. The disk controller 31 includes a CPU and a memory. The disk controller 31 performs various kinds of processing to realize the functions of the storage apparatus 3. The disk device 34 includes one or more hard disks 341 (physical disks). The cache memory 32 stores, for example, data to be written into the disk device 34 or data to be read from the disk device 34.

Path Configuration

The server system 2 is coupled to the storage apparatus 3 through a plurality of paths $P_i$ (i=1 to n, where n is the total number of paths.) The server system 2 issues an I/O to the storage apparatus 3 through one of the paths $P_i$.

Each of the paths $P_i$ is specified (configured) by a combination of a network port 1611 of the HBA 161 of the server system 2, a network port 231 of the CHA 33 of the storage apparatus 3, and a network port 61 of the switch 6.

Figure 2:
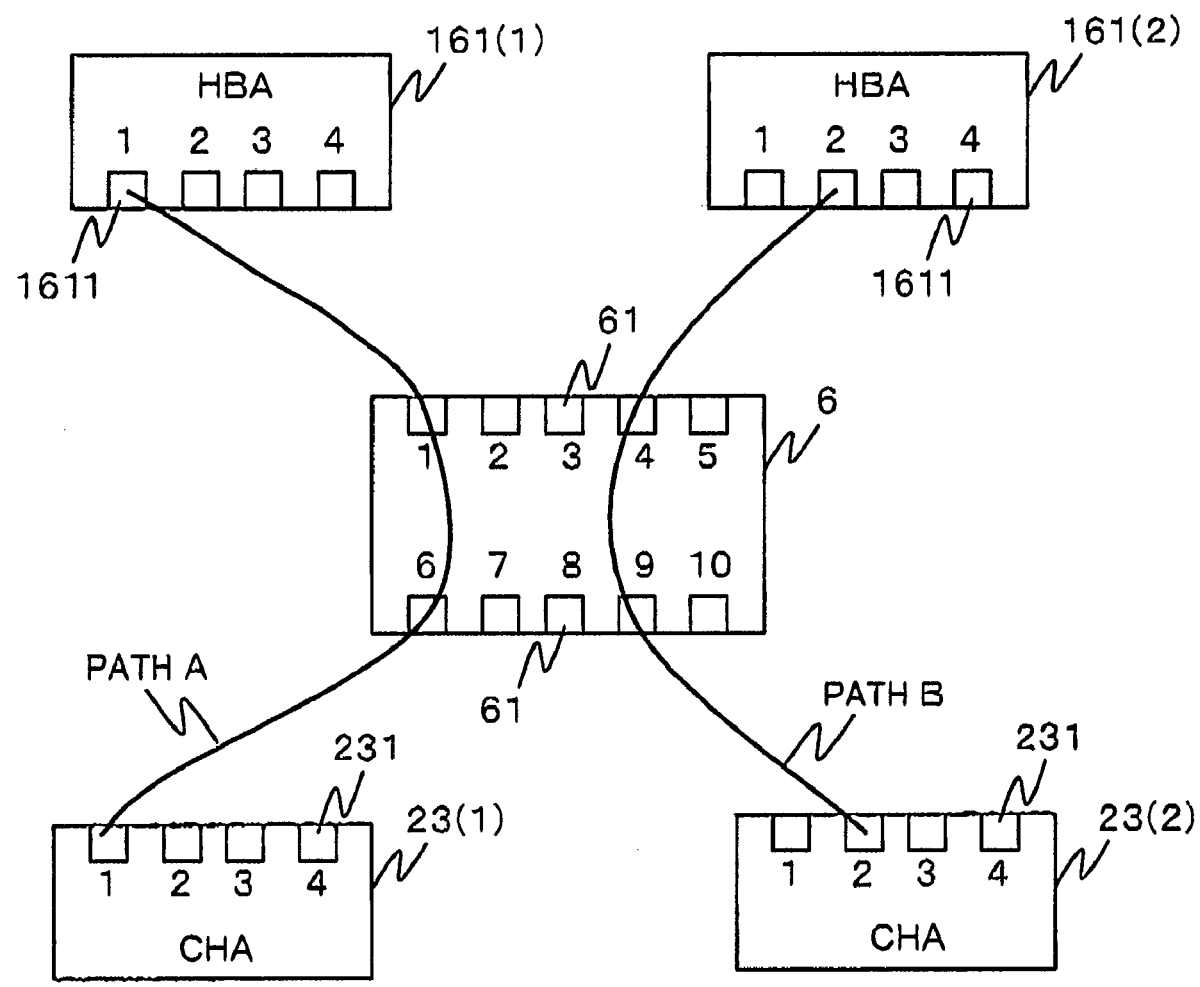
FIG. 2 is a diagram showing an example of path configurations.

FIG. 2 shows examples of path configurations. Path A shown in FIG. 2 is specified (configured) by the first network port 1611 of the HBA 161 (1) of the server system 2, the first and sixth network ports 61 of the switch 6, and the first network port 231 of the CHA 33 (1). Path B shown in FIG. 2 is specified (configured) by the second network port 1611 of the HBA 161 (2) of the server system 2, the fourth and ninth network ports 61 of the switch 6, and the second network port 231 of the CHA 33 (2).

Description of Functions

Figure 3:
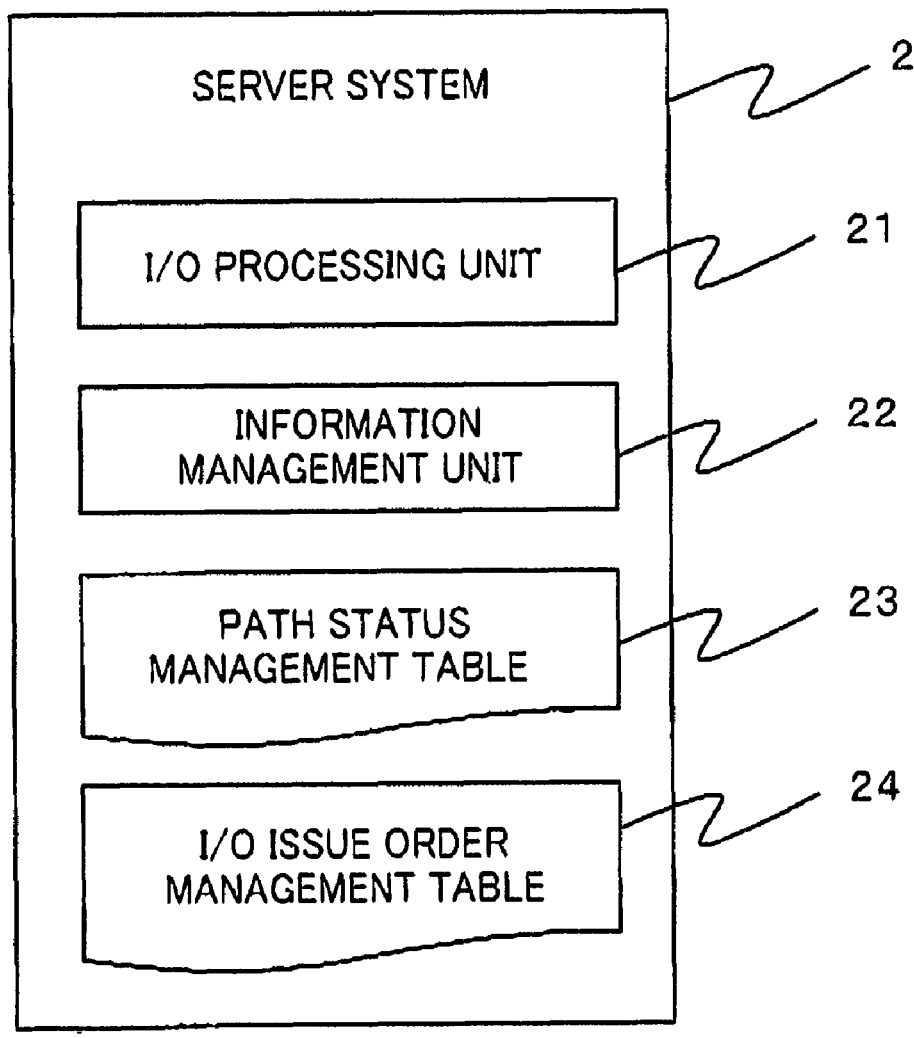
FIG. 3 is a diagram showing functions of the server system 2 and tables managed by the server system 2.

FIG. 3 shows functions of the server system 2 and tables managed by the server system 2. As shown in FIG. 3, the server system 2 includes an I/O processing unit 21 (a fourth processing unit) and an information management unit 22 (a first processing unit). Further, the server system 2 manages a path status management table 23 and an I/O issue order management table 24.

The I/O processing unit 21 accepts an I/O request to the storage apparatus 3 from the task application operating on the server system 2. Then, based on the path status management table 23 and the I/O issue order management table 24, the I/O processing unit 21 determines which of the paths $P_i$ to use to issue an I/O corresponding to the accepted I/O request. The I/O processing unit 21 then issues the I/O to the storage apparatus 3 through the determined one of the paths $P_i$.

The information management unit 22 manages the contents of the path status management table 23 and the I/O issue order management table 24. The information management unit 22 measures a data volume (for example, sum of uploaded and downloaded data volumes) that flows on the path $P_i$ in response to the I/O issued by the I/o processing unit 21. The information management unit 22 then stores the measurement result in the path status management table 23. The information management unit 22 transmits information stored in the path status management table 23 to the management server 4 either voluntarily or in response to a request from the management server 4. Further, the information management unit 22 updates the I/O issue order management table 24 on the basis of information transmitted from the management server 4.

Figure 4:
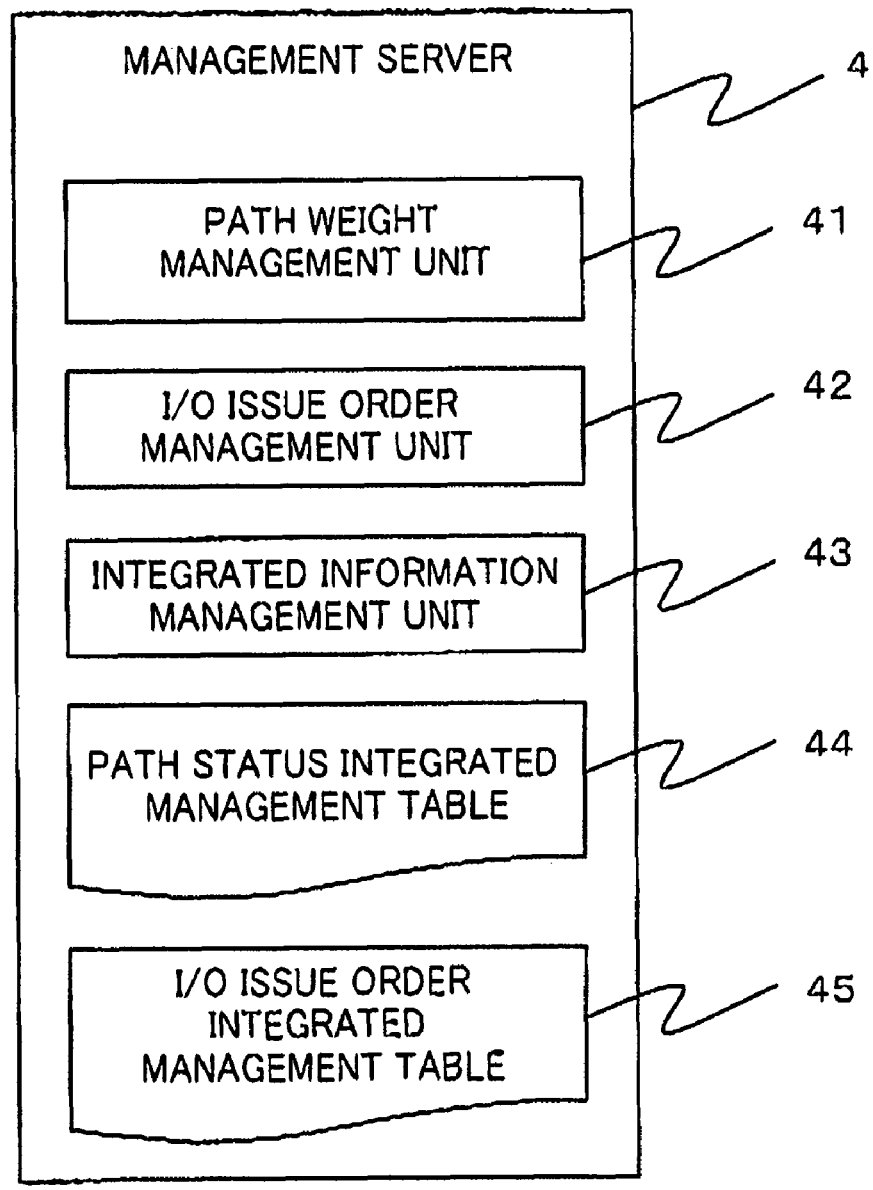
FIG. 4 is a diagram showing functions of the management server 4 and tables managed by the management server 4.

FIG. 4 shows functions of the management server 4 and tables managed by the management server 4. As shown in FIG. 4, the management server 4 includes functions of a path weight management unit 41 (a first processing unit), an I/O issue order management unit 42 (a second processing unit), and an integrated information management unit 43 (a first processing unit). Further, the management server 4 manages a path status integrated management table 44 and an I/O issue order integrated management table 45.

Based on the path status integrated management table 44, the path weight management unit 41 calculates weights $W_i$ of the respective paths $P_i$ of each server system 2. The path weight management unit 41 further sums up the weights $W_i$ of the respective paths $P_i$ of each server system 2 to obtain a sum total $\Sigma W_i$ of the weights $W_i$. The path weight management unit 41 then stores the obtained result in the path status integrated management table 44.

Based on the weights $W_i$ and the sum total $\Sigma W_i$ obtained by the path weight management unit 41, the I/O issue order management unit 42 determines an order in which I/Os are issued to the paths $P_i$ of each server system 2 (hereafter, such order is simply called an I/O issue order), and stores the result in the I/O issue order integrated management table 45.

The integrated information management unit 43 stores (reflects) the information transmitted from each server system 2 in the path status integrated management table 44. Further, the integrated information management unit 43 acquires information from the switch 6 and the storage apparatus 3 through the management network 8, and stores the acquired information in the path status integrated management table 44. Moreover, the integrated information management unit 43 appropriately transmits (delivers) the I/O issue order of each server system 2, which is stored in the I/O issue order integrated management table 45, to the corresponding server system 2.

Description of Tables

FIG. 5 shows examples of the path status management table 23 managed by the server system 2. FIG. 5 shows examples of the path status management table 23 managed by two different server systems 2 (a server system 1 and a server system 2), respectively.

As shown in FIG. 5, each record in the path status management table 23 includes items of: a path name 231, a flag value 232 (delay and failure), a counter value 233 (delay and failure), and a processed data volume 234.

The path name 231 stores an identifier of each path Pi. As shown in FIG. 5, the server system 1 has four paths leading to the storage apparatus 3, whereas the server system 2 has eight paths leading to the storage apparatus 3.

The flag value 232 and the counter value 233 each stores information indicating statuses (delay and failure) of the path $P_i$.

"1" is stored in the "delay" of the flag value 232 when a delay is caused in the corresponding path $P_i$, whereas "0" is stored when there is no delay. Note that the information management unit 22, for example, determines whether or not there is a delay in the path by comparing a threshold value and a result of measuring the turn-around time of the I/O, or the like.

"1" is stored in the "failure" of the flag value 232 when there is a failure in the corresponding path $P_i$, whereas "0" is stored when there is no failure. Note that the information management unit 22, for example, determines whether or not there is a failure in the path, for example, by judging whether there has been a response from the storage apparatus 3 within a certain period of time after a transmission of an I/O.

The "delay" of the counter value 233 stores the number of delays in the corresponding path $P_i$ within a predetermined period. The "failure" of the counter value 233 stores the number of failures in the corresponding path $P_i$ within a predetermined period. The processed data volume 234 stores a data volume that flows on the path $P_i$ in response to an I/O issued by the I/O processing unit 21. The information management unit 22 measures the data volume.

FIG. 6 shows an example of the path status integrated management table 44 managed by the management server 4.

As shown in FIG. 6, each record in the path status integrated management table 44 has items of: a server name 441, a path name 442, a path ID 443, a current weight 444, a flag value 445 (delay and failure), a counter value 446 (delay and failure), a processed data volume 447, a revised weight 448, HBA performance information 449, switch performance information 450, and CHA performance information 451.

Among these items, the server name 441 stores an identifier of the server system 2. The path name 442 stores a path name. The path ID 443 stores an identifier of the path $P_i$. The current weight 444 stores a weight currently assigned to the path $P_i$. The flag value 445, the counter value 446, and the processed data volume 447 each store the same information similar to that stored in the path status management table 23 (the information acquired by the integrated information management unit 43 from each server system 2.)

The revised weight 448 stores a weight obtained based on a current data volume of each path $P_i$ (which is the data volume of each path $P_i$ acquired most recently.) The HBA performance information 449 stores performance information (data throughput per unit time) of the HBA 161 that is included in the corresponding path $P_i$, the performance information acquired from the server system 2. The switch performance information 450 stores performance information (data throughput per unit time) of the switch 6 that is included in the corresponding path $P_i$, the performance information acquired from the switch 6. The CHA performance information 451 stores performance information of the CHA 33 that is included in the corresponding path $P_i$, the performance information acquired from the storage apparatus 3.

As shown in FIG. 6, the HBA performance information 449, the switch performance information 450, and the CHA performance information 451 each store current performance information as well as performance information acquired after revision. Note that the values in the shaded portions shown in FIG. 6 are factors for reviewing the weight assignment. Such highlighted display is also carried out as needed when the user refers to the path status integrated management table 44 through the GUI or CUI.

FIG. 7 shows an example of the I/O issue order integrated management table 45 managed by the management server 4. As shown in FIG. 7, the I/O issue order integrated management table 45 stores a path allocation order (selection order) in which the I/O processing unit 21 of each server system 2 should issue I/Os in response to I/O requests received from an application or an operating system operating on the external apparatus or another server system 2.

Note that the contents of the I/O issue order management table 24 managed by each server system 2 are the same as the contents for the server system 2 in the I/O issue order integrated management table 45. In each of the server system 2, the information management unit 22 communicates with the integrated information management unit 43 of the management server 4 to thereby acquire the corresponding contents of the I/O issue order integrated management table 45 of the management server 4, and then stores the acquired contents in the I/O issue order management table 24.

In the example of the I/O issue order integrated management table 45 shown in FIG. 7, the server system 1 issues I/Os in accordance with the contents of the I/O issue order integrated management table 45, namely, in the order of Path B, Path A, Path D, Path B, and so on. Meanwhile, the server system 2 issues I/Os in the order of Path D, Path G, Path C, Path H, and so on.

Description of Processing

With reference to the drawings, a description will be given below of processing performed by the information processing system 1.

Figure 8:
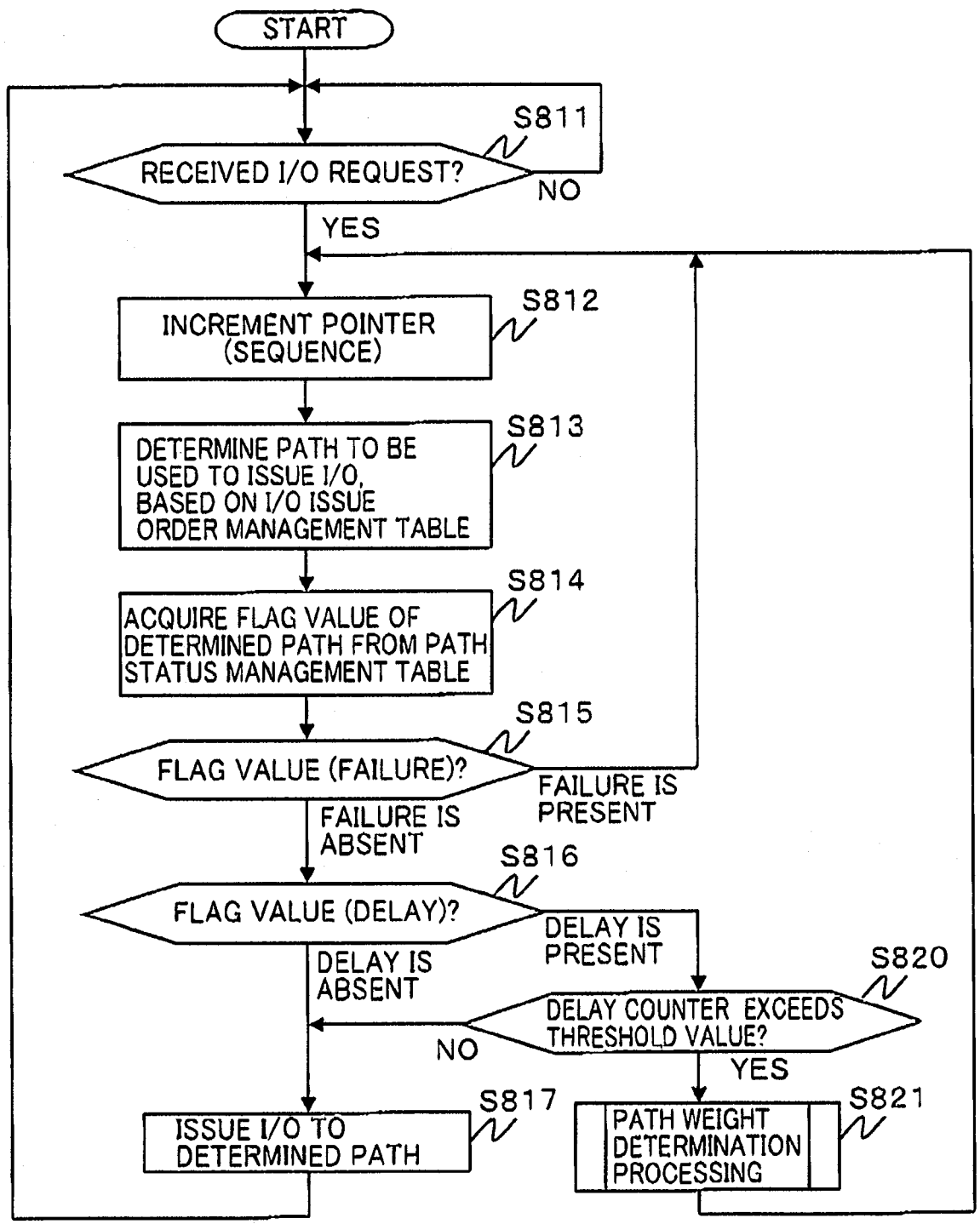
FIG. 8 is a flowchart explaining I/O issue processing S800.

FIG. 8 is a flowchart explaining processing (I/O issue processing S800) performed when the I/O processing unit 21 of the server system 2, upon receipt of an 1/O request from the external apparatus, issues (transmits) an I/O to the storage apparatus 3 through one of the paths $P_i$. With reference to FIG. 8, the I/O issue processing S800 will be described in detail below.

The I/O processing unit 21 monitors the presence of an I/O request in real time (S811: NO). When the I/O processing unit 21 receives an I/O request (S811: YES), the processing proceeds to S812.

In S812, the I/O processing unit 21 refers to the I/O issue order management table 24 to determine the path $P_i$ to which an I/O is to be issued (allocated). Specifically, the I/O issue order management table 24 stores the sequence number (pointer) lastly used to issue the I/O. The I/O processing unit 21 increments (adds 1 to) the sequence number stored in the I/O issue order management table 24, and determines a path $P_i$ corresponding to the sequence number (pointer) thus incremented, as the path $P_i$ to which an I/O is to be issued (S812 and S813).

Next, from the path status management table 23, the I/O processing unit 21 acquires the values in the flag value 232 of the path $P_i$ determined in S813 (S814).

In S815, the I/O processing unit 21 refers to the acquired flag value to determine the presence of a failure. If there has been a failure (S815: failure is present), the processing returns to S812. If there has been no failure (S815: failure is absent), the processing proceeds to S816.

In S816, the I/O processing unit 21 refers to the flag value acquired in S814 to determine the presence of a delay. If there has been a delay (S816: delay is present), the processing proceeds to S820. If there has been no delay (S816: delay is absent), the processing proceeds to S817.

In S817, the I/O processing unit 21 issues an I/O to the path $P_i$ determined in S813. Thereafter, the processing returns to S811.

In S820, the I/O processing unit 21 refers to the counter value 233 in the path status management table 23 to determine if the delay counter has exceeded a predetermined threshold value or not. If the delay counter has exceeded the predetermined threshold value (S820: YES), the processing proceeds to S821. If the delay counter has not exceeded the predetermined threshold value (S820: NO), the I/O processing unit 21 issues an I/O to the path $P_i$ determined in 5813 (S817).

In S821, the I/O processing unit 21 performs path weight determination processing. Then, the processing returns I/O S812. A detailed description will be given later of the path weight determination processing S821.

As described above, upon issue of an I/O request from the task application or the like, the I/O processing unit 21 determines, according to the order set in the I/O issue order management table 24, which path $P_i$ to use to issue an I/O. Then, as long as the path $P_i$ thus determined has neither a failure nor a delay exceeding the threshold value, the I/O processing unit 21 issues an I/O to the determined path $P_i$.

Figure 9:
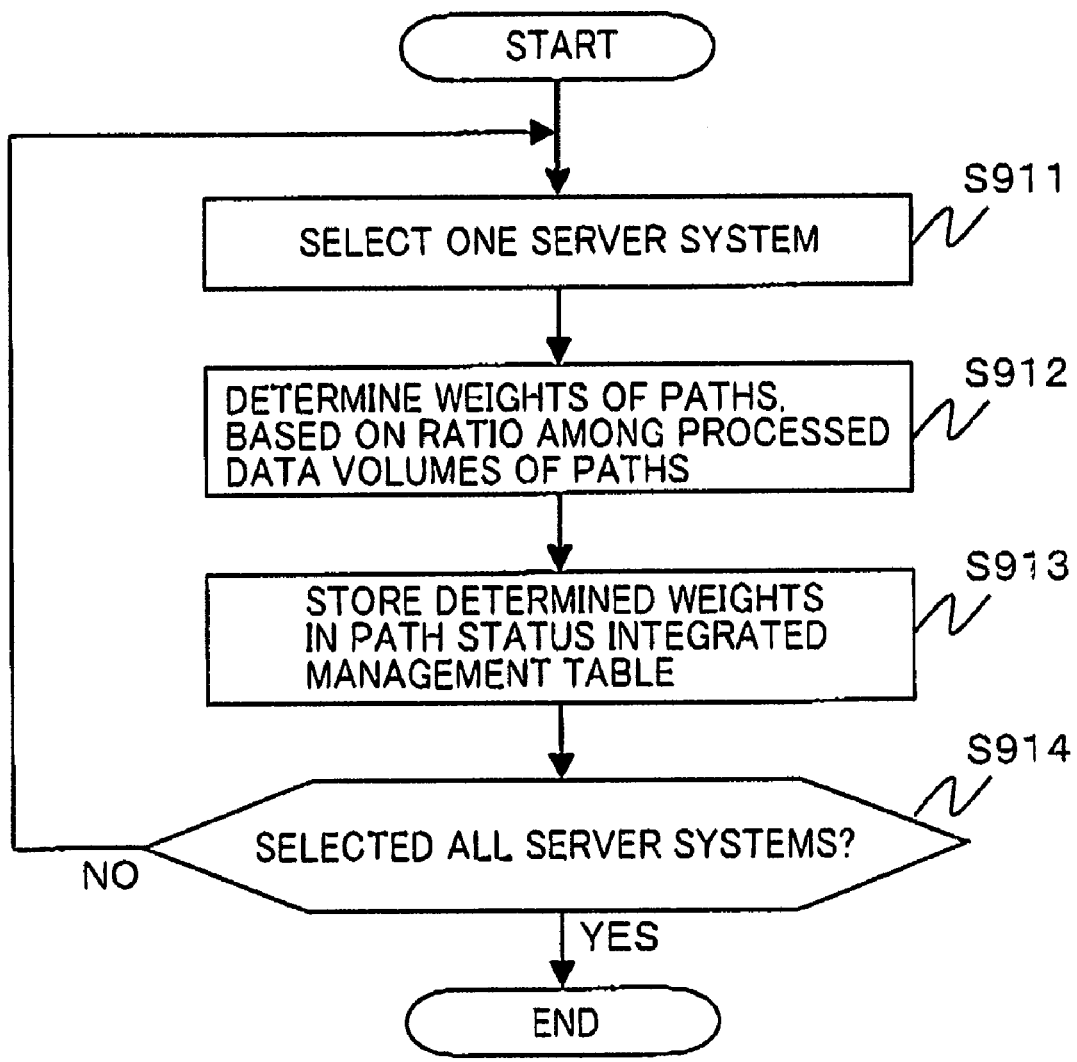
FIG. 9 is a flowchart explaining path weight determination processing S821.

FIG. 9 is a flowchart explaining the path weight determination processing S821 which is performed by the path weight management unit 41 of the management server 4. With reference to FIG. 9, the path weight determination processing S821 will be described in detail below.

First of all, the path weight management unit 41 selects one server system 2 from the path status integrated management table 44 (S911).

Next, the path weight management unit 41 uses a ratio among the processed data volumes of the respective paths $P_i$ of the server system 2 selected in S911 to determine the weights $W_i$ of the respective paths $P_i$, and then stores the determined weights in the path status integrated management table 44 (S912 and S913).

When the path status integrated management table 44 has the contents shown in FIG. 6, for example, the weights $W_i$ (Path A=10, Path B=12, Path C=3, and Path D=8) determined according to the processed data volume 447 in the path status integrated management table 44, are stored in the current weight 444 in the path status integrated management table 44.

In S914, the path weight management unit 41 determines whether or not all of the server systems 2 registered in the path status integrated management table 44 have been selected. If there is any unselected server system 2 (S914: NO), the processing returns to S911. If all of the server systems 2 have been selected (S914: YES), the processing is terminated.

As described above, the weights $W_i$ of the respective paths $P_i$ of each server system 2 are appropriately set through the path weight determination processing S821 performed by the path weight management unit 41.

Figure 10:
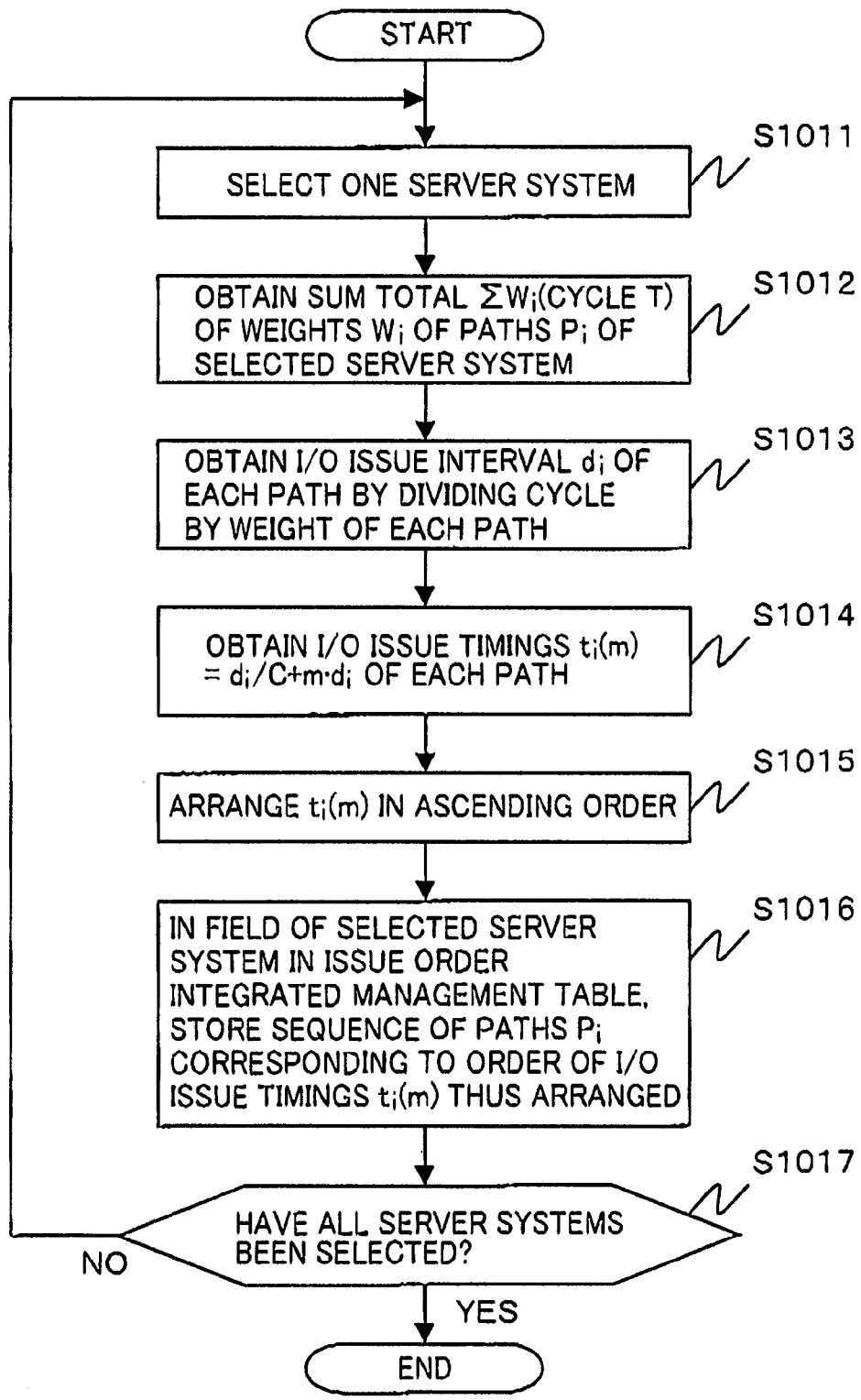
FIG. 10 is a flowchart explaining I/O issue order determination processing S1000.

FIG. 10 is a flowchart explaining I/O issue order determination processing S1000 which is performed by the I/O issue order management unit 42 of the management server 4. With reference to FIG. 10, the I/O issue order determination processing S1000 will be described in detail below.

First of all, the I/O issue order management unit 42 selects one server system 2 from the path status integrated management table 44 (S1011).

Next, the I/O issue order management unit 42 calculates the sum total $\Sigma W_i$ of the path weights $W_i$ of the respective paths $P_i$ of the server system 2 selected at S1011 (S1012).

In the case of the server system 1 shown in FIG. 6, for example, the weights $W_i$ of Paths A, B, C and D are 10 ($W_1$), 12 ($W_2$), 3 ($W_3$) and 8 ($W_4$), respectively. Accordingly, The sum total $\Sigma W_i = W_1 + W_2 + W_3 + W_4 = 10+12+3+8=33$.

Next, the I/O issue order management unit 42 obtains an I/O issue interval $d_i$ for each of the paths $P_i$ by dividing the sum total $\Sigma W_i$ obtained at S1012 by the weight $W_i$ of each path $P_i$ (S1013).

In the case of the server system 1 shown in FIG. 6, for example, the I/O issue intervals $d_i$ of the respective paths $P_i$ are as follows:

$$d_1 = \Sigma W_i/W_1 = 33/10 = 3.3,$$

$$d_2 = \Sigma W_i/W_2 = 33/12 = 2.75,$$

$$d_3 = \Sigma W_i/W_3 = 33/3 = 11, \text{ and}$$

$$d_4 = \Sigma W_i/W_4 = 33/8 = 4.125.$$

Next, for each of the paths $P_i$, the I/O issue order management unit 42 obtains I/O issue timings $t_i(m)$ that is a timing at which an I/O is issued to the path $P_i$. More specifically, the I/O issue timings $t_i(m)$ are calculated from the following equation with the use of the I/O issue interval $d_i$ of each of the paths $P_i$ obtained in S1013 (S1014):

$$t_i(m) = d_i/C + m \cdot d_i \; (m=0, 1, 2, \ldots) \text{ (where } C \text{ is a constant)}.$$

Here, in the equation $t_i(m) = d_i/C + m \cdot d_i$ for obtaining the I/O issue timing $t_i(m)$, it is easier to determine the I/O issue order of the plurality of paths $P_i$ when the values of the I/O issue timings $t_i(m)$ of the paths $P_i$ are less concentrated. From such viewpoint, an appropriate (optimal) value of C (C>1) is C=2.

Specifically, when C>2, the values of the I/O issue timings $t_i(m)$ of the paths $P_i$ are concentrated at a beginning part of a cycle, as compared to the case where C=2. Accordingly, it is difficult to determine the issue order at the beginning part of the cycle.

Meanwhile, when 2>C>1, the values of the I/O issue timings $t_i(m)$ of the paths $P_i$ are concentrated not at the beginning part of the cycle but at an end part of the cycle, as compared to the case where C=2. Accordingly, it is difficult to determine the issue order at the end part of the cycle.

To be more specific, here, assume that the maximum value and the minimum value of the plurality of I/O issue intervals $d_i$ are denoted as $d_{Max}$ and $d_{Min}$, respectively. When C>2, the plurality of I/O issue timings $t_i(m)$ are within a width of $(d_{Max} - d_{Min})/C$ that is narrower than a width when C=2, i.e., $(d_{Max} - d_{Min})/2$. Meanwhile, taking the end of the cycle as a starting point, the same is true in the case where 2>C>1. Specifically, when 2>C>1, the width is $(d_{Max} - d_{Min}) \cdot (1 - 1/C)$ that is narrower than the width where C=2.

As has been described above, in order to prevent the values of the I/O issue timings $t_i(m)$ of the paths $P_i$ from being concentrated at both the beginning part and the end part of the cycle, the appropriate (optimal) value of C is C=2. However, when two or more paths have a simultaneous I/O issue timing, the value of C (C>1) for each of these paths may be changed (slightly) based on factors other than the path weight.

In the case of the server system 1 shown in FIG. 6, for example, the following I/O issue timings ($t_1(m)$ to $t_4(m)$) are obtained for the Paths A to D when C=2.

<I/O Issue Timing $t_1(m)$ of Path A>
  $t_1(0)=1.65$
  $t_1(1)=4.95$
  $t_1(2)=8.25$
  $t_1(3)=11.55$
  $t_1(4)=14.85$
  $t_1(5)=18.15$
  $t_1(6)=21.45$
  $t_1(7)=24.75$
  $t_1(B)=28.05$
  $t_1(9)=31.35$ <I/O Issue Timing $t_2(m)$ of Path B>
  $t_2(0)=1.38$
  $t_2(1)=4.13$
  $t_2(2)=6.88$
  $t_2(3)=9.63$
  $t_2(4)=12.38$
  $t_2(5)=15.13$
  $t_2(6)=17.88$
  $t_2(7)=20.63$
  $t_2(8)=23.38$
  $t_2(9)=26.13$
  $t_2(10)=28.88$
  $t_2(11)=31.63$ <I/O Issue Timing $t_3(m)$ of Path C>
  $t_3(0)=5.5$
  $t_3(1)=16.5$
  $t_3(2)=27.5$ <I/O Issue Timing $t_4(m)$ of Path D>
  $t_4(0)=2.06$
  $t_4(1)=6.19$
  $t_4(2)=10.31$
  $t_4(3)=14.44$
  $t_4(4)=18.56$
  $t_4(5)=22.69$
  $t_4(6)=26.81$
  $t_4(7)=30.94$ Next, the I/O issue order management unit 42 arranges all the I/O issue timings $t_i(m)$ of the all the paths $P_i$ obtained in S1014 in ascending order, regardless of which path $P_i$ each timing belongs to (S1015). Thereby, in the case of the server system 1 shown in FIG. 6, for example, the following order (sequence) is obtained: $X_2(0) \rightarrow X_1(0) \rightarrow X_4(0) \rightarrow X_2(1) \rightarrow X_1(1) \rightarrow X_3(0)$ . . . . That is, the order being B A D B A C D B A B D A B D A B C B A D B A D B A B D C A B D A B.

Figure 11:
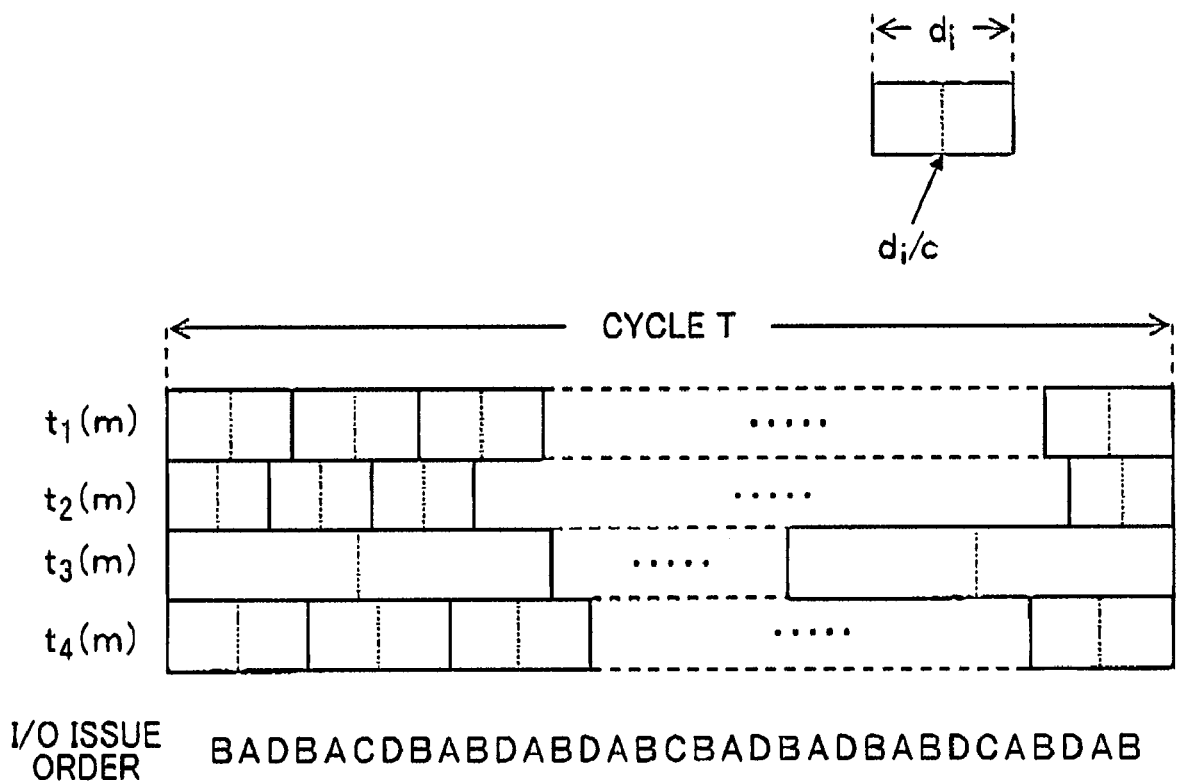
FIG. 11 is a diagram explaining how an I/O issue order management unit 42 obtains an I/O issue (allocation) order (sequence) by arranging I/O issue timings $t_i(m)$ in ascending order.

FIG. 11 schematically shows how the I/O issue order is determined. In FIG. 11, the width of each cell indicated by solid lines corresponds to $d_i$. A broken line in each cell indicates a point of $d_i/C$. Note that the I/O issue interval $d_i$ of each path $P_i$ is obtained by dividing the sum total $\Sigma W_i$ by the weight $W_i$ of the path $P_i$. Therefore, each path $P_i$ is assured the number of I/O issues which is based on the weight $W_i$ of the path $P_i$, during a cycle T equivalent to a period of the least common multiple of the I/O issue intervals $d_i$ of the respective paths $P_i$. For this reason, the load balancing effect, to be achieved by setting the weights $W_i$ for the paths $P_i$, is not impaired when I/Os are issued in the I/O issue order determined as described above.

Next, in the field of the selected server system 2 in the issue order integrated management table 45, the I/O issue order management unit 42 stores the sequence of the paths $P_i$ obtained in S1015 as the I/O issue order of the paths $P_i$ for that server system 2 (S1016). Note that the order (sequence) thus obtained is delivered from the integrated information management unit 43 of the management server 4 to the information management unit 22 of the corresponding server system 2. Then, each server system 2 stores the delivered sequence therein as the I/O issue order management table 24, and uses the delivered sequence as the information specifying the I/O issue order.

Thereafter, the I/O issue order management unit 42 determines whether or not all of the server systems 2 registered in the path status integrated management table 44 have been selected. If there is any unselected server system 2 (S1017: NO), the processing returns to S1011. If all of the server systems 2 have been selected (S1017: YES), the processing is terminated.

According to the I/O issue order determination processing S1000 described above, I/Os will not be issued to a certain path $P_i$ assigned a high weight in a concentrated manner, for example, in a short period of time. In the case shown in FIG. 6, for example, if there is no restriction on the issue timings for the each path $P_i$, some type of algorithm of load balancing based on the weights assigned to the paths $P_i$ may cause many I/Os to be issued during a short period of time in a concentrated manner to a particular path $P_i$ assigned a high weight, for example (Path B in FIG. 6). However, according to the I/O issue order determination processing S1000 described above, I/Os are not allocated to a particular one of the paths $P_i$ during a short period of time in a concentrated manner.

Incidentally, there maybe a case where the I/O issue timings $t_i(m)$ of different paths $P_i$ that coincide with each other when the I/O issue timings $t_i(m)$ are arranged in ascending order. In such a case, for example, an I/O is made to be allocated more preferentially to one of the paths $P_i$ having coinciding I/O issue timings $t_i(m)$ and having a lower load at that point. In this way, when the I/O issue timings $t_i(m)$ of the different paths $P_i$ coincide with each other, an I/O can be allocated more preferentially to the path $P_i$ having a lower load. Accordingly, an appropriate load balancing can be carried out.

Alternatively, when the I/O issue timings $t_i(m)$ of different paths $P_i$ coincide with each other, an I/O may be issued more preferentially to one of the paths $P_i$ having higher processing performance (such as the band and chip processing speed), for example. In this way, when the I/O issue timings $t_i(m)$ of the different paths $P_i$ coincide with each other, an I/O can be allocated more preferentially to the path $P_i$ having higher processing performance. Accordingly, an appropriate load balancing can be carried out.

Further, in a case where different paths $P_i$ in a certain combination have the I/O issue timings $t_i(m)$ cyclically coinciding with each other, the path $P_i$ to which an I/O is issued first is switched alternately between (or cyclically among) the different paths $P_i$ every time the I/O issue timings $t_i(m)$ coincide.

In this way, when the I/O issue timings $t_i(m)$ corresponding to different paths $P_i$ coincide with each other, I/Os can be allocated to the paths $P_i$ evenly without putting a too much load on one path $P_i$.

It should be noted that the above-described embodiment is given to facilitate the understanding of the present invention, and is not intended to limit the present invention. It is needless to say that various changes and modifications to the present invention may be made without departing from the scope of the present invention, and that the present invention includes equivalents thereof.

For example, in the path weight determination processing S821, the weight $W_i$ of each path $P_i$ is determined based on the ratio among the processed data volumes of the respective paths $P_i$, in other words, the load status of each path $P_i$.

Alternatively, the weight $W_i$ may be determined based on the processing performance (such as the band or the CPU performance) of each path $P_i$, or based on the failure rate of each path $P_i$.

Moreover, the path weight determination processing S821 may be performed not only when the delay counter exceeds the threshold, but also at an appropriate timing scheduled in advance. By frequently revising the weight $W_i$ of each path $P_i$ in this way, allocation of I/Os to the paths $P_i$ can be performed more appropriately.

What is claimed is:

1. An information processing system that communicates with a storage apparatus through a plurality of paths $P_i$ (i=1 to n, where n is a total number of the paths), and issues an I/o to the storage apparatus through one of the paths $P_i$, the information processing system comprising:
  a first processing unit that sets weights $W_i$ to the respective paths $P_i$;
  a second processing unit that obtains an I/O issue interval $d_i$ by dividing a sum total $\Sigma W_i$ of the weights $W_i$ by the weight $W_i$ set to the respective paths $P_i$;
  a third processing unit that obtains I/O issue timings $t_i(m)$ of each of the paths $P_i$ from the following equation:

$t_i(m)=d_i/C+m\cdot d_i$ (m=0, 1, 2, ...) (where C is a constant);

and
  a fourth processing unit that issues the I/Os to the paths $P_i$ in an order corresponding to an order of the I/O issue timings $t_i(m)$ chronologically arranged.

2. The information processing system according to claim 1, wherein
  the first processing unit recalculates the weights $W_i$ when load change in the path $P_i$ has exceeded a threshold value,
  the second processing unit obtains again the I/O issue interval $d_i$, based on the weights $W_i$ thus recalculated,
  the third processing unit obtains again the I/O issue timings $t_i(m)$, based on the once again obtained I/O issue interval $d_i$, and
  the fourth processing unit issues the I/Os to the paths $P_i$ in an order corresponding to an order of the once again obtained I/O issue timings $t_i(m)$ chronologically arranged.

3. The information processing system according to claim 1, wherein
  the first processing unit sets the weights $W_i$ according to loads on and performance of the respective paths $P_i$.

4. The information processing system according to claim 1, wherein
  the paths $P_i$ are identified by a combination of a network port of the information processing system, a network port of the storage apparatus, and a network port of a switch interposed between the network ports of the information processing system and the storage apparatus.

5. The information processing system according to claim 1, wherein
  the fourth processing unit issues the I/Os in an order giving priority to the path $P_i$ having a lower load among the paths $P_i$ having coinciding I/O issue timings $t_i(m)$, when there are paths $P_i$ that have coinciding I/O issue timings $t_i(m)$, the coinciding I/O issue timings $t_i(m)$ being the I/o issue timings $t_i(m)$ of different ones of the paths $P_i$ that coincide with each other as a result of arranging the I/O issue timings $t_i(m)$ in chronological order.

6. The information processing system according to claim 1, wherein
  the fourth processing unit issues the I/Os in an order giving priority to the path $P_i$ having a higher performance among the paths $P_i$ having coinciding I/O issue timings $t_i(m)$, when there are paths $P_i$ that have coinciding I/O issue timings $t_i(m)$, the coinciding I/O issue timings $t_i(m)$ being the I/O issue timings $t_i(m)$ of different ones of the paths $P_i$ that coincide with each other as a result of arranging the I/O issue timings $t_i(m)$ in chronological order.

7. The information processing system according to claim 1, wherein
  the fourth processing unit cyclically replaces the path $P_i$ given priority to issue the I/Os among the paths $P_i$ each time an I/O issue timing $t_i(m)$ coincides, when having cyclically coinciding I/O issue timings $t_i(m)$, the cyclically coinciding I/O issue timings $t_i(m)$ being the I/O issue timings $t_i(m)$ of different ones of the paths $P_i$ that coincide with each other as a result of arranging the I/O issue timings $t_i(m)$ in chronological order.

8. In an information processing system that communicates with a storage apparatus through the plurality of paths $P_i$, and issues the I/O to the storage apparatus through one of the paths $P_i$, a method of allocating an I/O to a plurality of paths $P_i$ (i=1 to n, where n is a total number of the paths) comprising:
  a first step of setting weights $W_i$ to the respective paths $P_i$;
  a second step of obtaining an I/O issue interval $d_i$ by dividing a sum total $\Sigma W_i$ of the weights $W_i$ by the weight $W_i$ set to the respective paths $P_i$;
  a third step of obtaining I/O issue timings $t_i(m)$ of the respective paths $P_i$ from the following equation:

$t_i(m)d_i/C+m\cdot d_i$ (m=0, 1, 2, ...) (where C is a constant);

and
  a fourth step of issuing the I/Os to the paths $P_i$ in an order corresponding to an order of the I/O issue timings $t_i(m)$ chronologically arranged.

9. The method of allocating an I/O to paths in an information processing system according to claim 8, wherein
  the information processing system
  recalculates the weights $W_i$, by performing the first step again, when load change in the path $P_i$ has exceeded a threshold value;
  obtains again the I/O issue interval $d_i$ based on the recalculated weights $W_i$ by performing the second step;
  obtains again the I/O issue timings $t_i(m)$ based on the once again obtained I/O issue interval $d_i$ by performing the third step; and
  issues the I/Os to the paths $P_i$ in an order corresponding to an order of the once again obtained I/O issue timings $t_i(m)$ chronologically arranged, by performing the fourth step.

* * * * *